United States Patent [19]
Saitoh

[11] Patent Number: 4,987,359
[45] Date of Patent: Jan. 22, 1991

[54] NUMERICAL CONTROL DEVICE
[75] Inventor: Kimio Saitoh, Aichi, Japan
[73] Assignee: Mitsubishi Denki Kabushiki Kaisha, Tokyo, Japan
[21] Appl. No.: 302,294
[22] Filed: Jan. 27, 1989
[30] Foreign Application Priority Data
  Jan. 29, 1988 [JP] Japan .................. 63-19044
[51] Int. Cl.$^5$ ............................. G05B 11/32
[52] U.S. Cl. ................... 318/625; 318/567; 318/568.1; 364/474.11; 364/474.31
[58] Field of Search ............ 318/625, 567, 568.1; 364/474

[56]  References Cited
U.S. PATENT DOCUMENTS
4,424,569  1/1984  Imazelei et al. ............ 364/474
4,558,419  12/1985  Kanematsu et al. ......... 364/474

FOREIGN PATENT DOCUMENTS
3116853  1/1982  Fed. Rep. of Germany .
3308765  10/1983  Fed. Rep. of Germany .

Primary Examiner—William M. Shoop, Jr.
Assistant Examiner—Saul M. Bergmann
Attorney, Agent, or Firm—Sughrue, Mion, Zinn, Macpeak & Seas

[57]  ABSTRACT

A numerical control device for a multi-axis lathe which is capable of controlling movements of a plurality of tools simultaneously. With the numerical control device, the movement of a first tool in a Z-axis direction is controlled according to the movement of a workpiece to be machined and the other movement of remaining tools in the Z-axis direction are controlled taking the Z-axis movement of the first tool into consideration, so that the different machining operations using different tools can be attained simultaneously or successively.

3 Claims, 4 Drawing Sheets

NUMERICAL CONTROL DEVICE

BACKGROUND OF THE INVENTION

This invention relates to a machining control method of a numerical control device (hereinafter referred to merely as "an NC", when applicable) for controlling a machine tool.

FIG. 1 shows the arrangement of an NC in four-axis control. In FIG. 1, reference numeral 1 designates a CRT (cathode ray tube) and keyboard assembly; 2, a control unit; 3, amplifier units; 4, electric motors; and 5, detectors.

FIG. 2 shows the arrangement of a four-axis lathe to which a machining control according to this invention is applicable. In FIG. 2, reference numeral 6 designates a first tool; 7, a first turret; 8, a second tool; 10, a workpiece moving along a Z-axis; and 11, a bushing for fixing the workpiece 10. The bushing 11 moves together with the workpiece 10 along the Z-axis The origin point of the machining program is designated as 0.

FIG. 3 is a block diagram showing a control system practiced by the control unit 2 and the amplifier units 3. In FIG. 3, reference numeral 12 designates an interpolating section for the first tool 6; 13, an interpolating section for the second tool 8; 14, an X-axis speed control section for the first tool 6; 15, a Z-axis speed control section for the first tool 6 (in practice, the workpiece being moved); 16, an X-axis speed control section for the second tool 8; 17, a Z-axis speed control section for the second tool 8; 18, an X-axis servo control section for the first tool 6; 19, a Z-axis servo control section (the Z-axis being of the workpiece 10) for the first tool 6, in which the direction of movement is reversed; 20, an X-axis servo control section for the second tool 8; and 21, a Z-axis servo control section for the second tool 8. Further in FIG. 3, reference characters fx1, fz1, fx2 and fz2 designate instruction speeds applied to the respective axes after interpolation; and Fx1, Fz1, Fx2 and Fz2, instruction speeds applied to the respective servo control sections.

First, the operator operates the keyboard 1 to input the machining programs which determine machining paths for the first and second tools 6 and 8, respectively. These machining programs are formed by referring to the machining program original point under the condition that the workpiece 10 is stationary; that is, it is machined with the tools 6 and 8 moving along the X-and Z-axis).

The control unit 2 forms tool moving instructions for the tools according to the machining programs thus inputted.

In response to the tool moving instruction for the first tool 6, the interpolating section 12 provides the instruction speeds fx1 and fz1 respectively for the X1-axis and the Z1-axis. The instruction speeds fx1 and fz1 thus provided are applied to the X-axis speed control 14 and the Z-axis speed control 15, respectively, which, in turn, applies the instruction speeds Fx1 and Fz1 to the servo control sections 18 and 19, respectively.

Similarly, in response to the tool moving instruction for the second tool 8, the interpolating section 13 provides the instruction speeds fx2 and fz2 respectively for the X2-axis and the Z2-axis. The instruction speeds fx2 and fz2 thus provided are applied to the X-axis speed control 16 and the Z-axis speed control 17, respectively, which in turn apply the instruction speed Fx2 and Fz2 to the servo control sections 20 and 21, respectively.

That is, after application of the tool moving instructions to the interpolating sections 12 and 13, the tools are controlled independently of each other.

The conventional NC control system is as described above. Therefore, in the case of the four-axis lathe in which, as shown in FIG. 2, the workpiece 10 is moved along the Z1-axis which is one of the control axes, while the workpiece being machined with the first tool 6 (i.e., the workpiece being moved), the machining program original point is also moving, and therefore the second tool 8 cannot be used until the workpiece 10 is returned to the machining program original point.

SUMMARY OF THE INVENTION

Accordingly, an object of the present invention is to eliminate the above-described difficulty accompanying a conventional NC control system. More specifically, an object of the invention is to provide a numerical control device with which the second tool 8 can be used even when the workpiece is being moved.

The above and other objects of the present invention are accomplished by the provision of a numerical control device wherein a second tool 8 is controlled to move along the Z2-axis thereof in synchronization with the movement of the workpiece 10 in the Z1-axis (i.e., the movement of the machining program original point).

DESCRIPTION OF THE PREFERRED EMBODIMENT

One preferred embodiment of this invention will be described with reference to the accompanying drawings.

Figure 3:
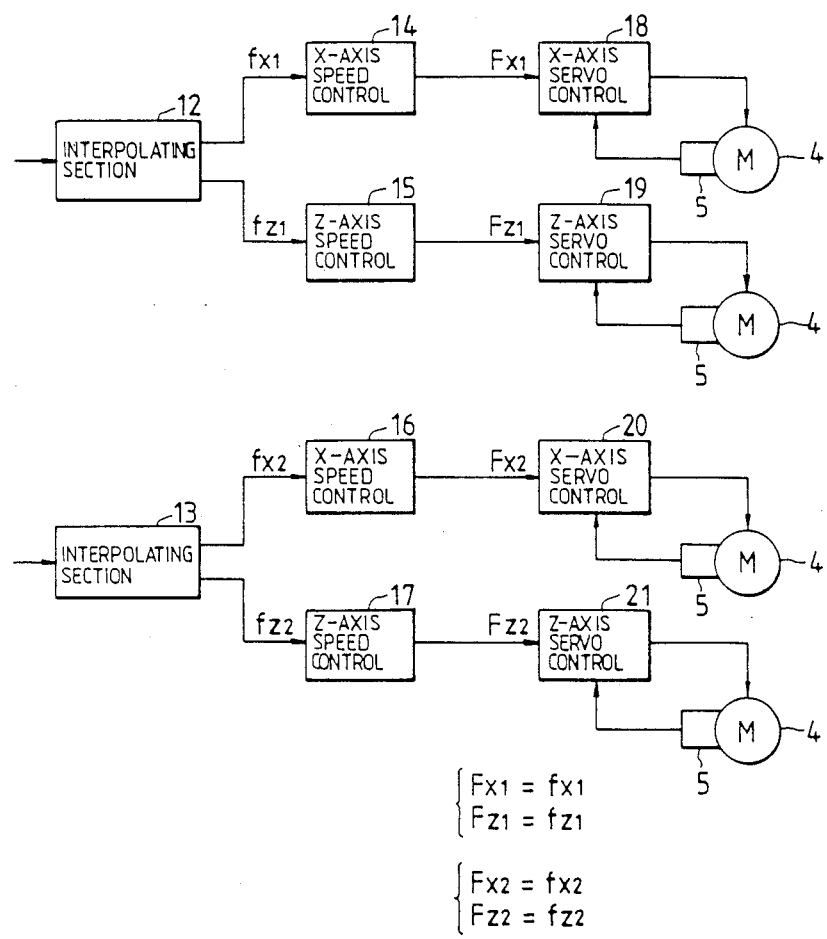
FIG. 3 is a block diagram showing a conventional NC control system.
Figure 4:
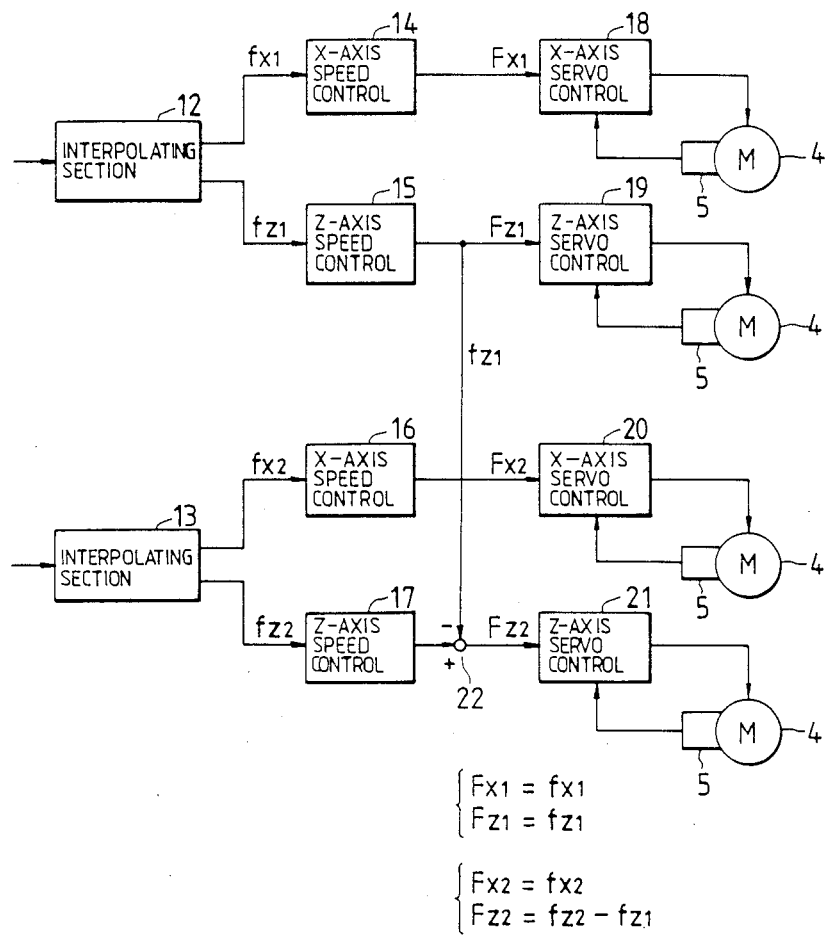
FIG. 4 is a block diagram showing an NC control system according to the invention.

In FIG. 4 which is a block diagram showing an embodiment of an NC apparatus of the present invention, where the same or corresponding parts as those shown in FIG. 3 bear the same reference numerals and reference numeral 22 designates an adder operating to add to an instruction speed signal fz2 for the second tool 8, an instruction speed fz1 which is the same as that is applied to the Z-axis servo control section 19.

In response to the tool moving instruction for the first tool 6, the interpolating section 12 provides instruction speeds fx1 and fz1 respectively for the X1 axis and the Z1 axis. The instruction speeds fx1 and fz1 thus provided are applied to the X-axis speed control section 14 and the Z-axis speed control section 15, respectively, which in turn apply instruction speeds Fx1 (=fx1) and Fx1 (=fx1) to the X-axis servo control section 18 and the Z-axis servo control section 19, respectively.

Similarly, in response to the tool moving instruction for the second tool 8, the interpolating section 13 provide instruction speeds fx2 and fz2 respectively for the X2 axis and the Z2 axis. The instruction speeds fx2 and fz2 thus provided are applied to the X-axis control section 16 and the Z-axis speed control section 17, respectively. Thereafter, as for the X2-axis, the X-axis speed control section 16 outputs an instruction speed Fx2 (=fx2), which is applied to the X-axis servo control section 20; and as for the Z2-axis, an instruction speed Fz2 (=fz2 −fz1) which is the sum of the instruction speed fz2 and the Z1-axis (the workpiece 10) instruction speed −fz1 22 is applied to the Z-axis servo control section 21.

Figure 1:
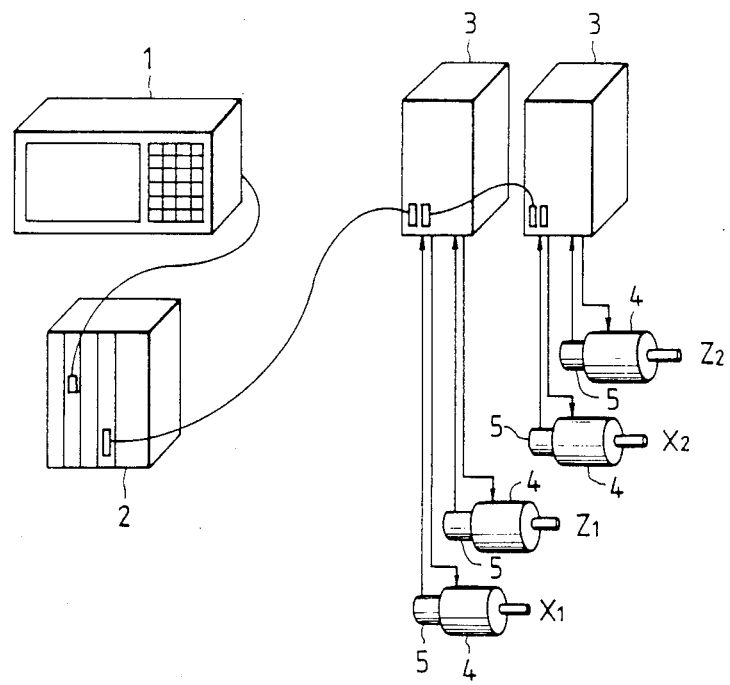
FIG. 1 is an explanatory diagram showing the arrangement of an NC in the case of four-axis control.
Figure 2:
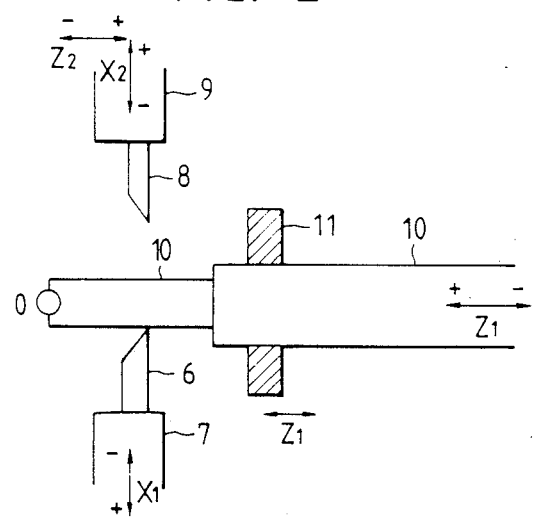
FIG. 2 is an explanatory diagram showing the arrangement of a four-axis lathe.

While the invention has been described with reference to the four-axis lathe, it should be noted that it is not limited thereto or thereby. That is, the same technical concept of the invention is applicable to a multi-axis lathe or a double-axis lathe (having the workpiece 10 and the second tool 8 in FIG. 2). In these cases, similarly as in the above-described embodiment, the workpiece may be machined with the second tool 8 while being moved. Further, in the multi-axis lathe, an instruction speed signal Fzn (fzn−fz1) is obtained for the Zn-axis movement of the n-th tool (n=1,2,3---).

Figure 5:
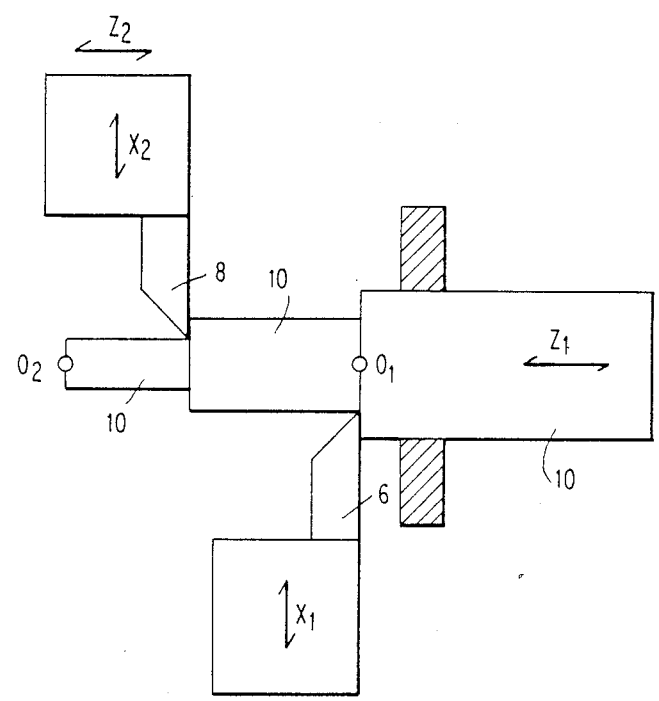
FIG. 5 is an explanatory diagram similar to FIG. 2 but showing each of the origins of coordinate systems of the machining programs.

In FIG. 5, a cylindrical workpiece 10 is supported by a chuck so that the cylindrical workpiece 10 rotates with respect to a Z-axis and it is also allowed to move along the Z-axis. A first tool 6 is movable in an X1 direction whereas the tool 6 is not allowed to move in a Z1 direction. The movement of the first tool 6 is controlled by an NC program using a coordinate system, an original $O_1$ of which is indicated in FIG. 5. On the other hand, a second tool 8 is allowed to move in both an X2 direction and the Z1 direction so that the positioning of the second tool 8 is controlled by the combination of movement of tool 8 in both the X2 and X1 axis directions and movement of the workpiece 10 in the Z1 axis direction. The origin of the coordinate system for tool 8 is $O_2$.

Especially in the case where it is required to subject a workpiece to a plurality of machining operations, according to the invention the machining operations can be achieved successively while the workpiece is being moved at constant speed; that is, it is unnecessary to return the workpiece to the machining program original point every machining operation.

As described above, in the four-axis lathe in which the workpiece 10 moves along the Z1-axis, according to the invention, the second tool 8 is controlled to move along the Z2-axis in synchronization with the movement of the workpiece along the Z1-axis. Therefore, even when the workpiece is being moved, it is possible to machine the workpiece by using a plurality of tools simultaneously, with the result that the machining time is reduced.

What is claimed is:

1. A numerical control device for a multi-axis lathe using a plurality of independently movable machining tools, in which a workpiece to be machined is rotated with respect to a Z-axis and is also moved along the Z-axis of a first machining tool comprising:

means for inputting control data for each of said tools, said control data including movement control data in an X-axis direction and a Z-axis direction; and means for adding the Z-axis movement control data for said first machining tool to each of the Z-axis movement control data for the remaining machining tools so that the Z-axis movements of the remaining machining tools are controlled according to outputs of said adding means, respectively, to thereby control the remaining machine tools to move along the Z-axis direction in synchronization with the movement of the workpiece along the Z-axis.

2. The numerical control device as defined in claim 1 wherein said multi-axis lathe is a four-axes lathe using two machining tools and said adding means operates to add the Z-axis movement control data for said first machining tool to the Z-axis movement control data for a second machining tool so that the Z-axis movement of said second tool is controlled according to the output of said adding means.

3. The numerical control device as defined in claim 1 wherein said control data is prepared with respect to an origin point of a machining program.

* * * * *